(12) United States Patent
Chalfin et al.

(10) Patent No.: US 11,049,216 B1
(45) Date of Patent: Jun. 29, 2021

(54) GRAPHICS PROCESSING SYSTEMS

(71) Applicant: Arm Limited, Cambridge (GB)

(72) Inventors: Alexander Eugene Chalfin, Mountain View, CA (US); Andreas Due Engh-Halstvedt, Trondheim (NO); Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 31 days.

(21) Appl. No.: 16/748,721

(22) Filed: Jan. 21, 2020

(51) Int. Cl.
*G06T 3/40* (2006.01)
*G06T 5/00* (2006.01)
*G06T 1/20* (2006.01)

(52) U.S. Cl.
CPC ............... *G06T 3/40* (2013.01); *G06T 1/20* (2013.01); *G06T 5/002* (2013.01)

(58) Field of Classification Search
CPC .................................. G06T 3/40; G06T 1/20
See application file for complete search history.

(56) References Cited

U.S. PATENT DOCUMENTS

| | | | |
|---|---|---|---|
| 7,920,139 B2 | 4/2011 | Nystad | |
| 8,289,318 B1* | 10/2012 | Hadap | ........................ G06T 7/40 345/420 |
| 9,558,585 B2 | 1/2017 | Nystad | |
| 9,805,447 B2 | 10/2017 | Engh-Halstvedt | |
| 10,043,306 B2 | 8/2018 | Isomaki | |
| 10,147,202 B2 | 12/2018 | Nystad | |
| 10,510,182 B2 | 12/2019 | Broadhurst et al. | |
| 10,540,808 B2 | 1/2020 | Andersson et al. | |
| 2004/0174379 A1* | 9/2004 | Collodi | ................... G06T 11/40 345/611 |
| 2005/0225670 A1* | 10/2005 | Wexler | ..................... G06T 5/20 348/441 |
| 2006/0232598 A1* | 10/2006 | Barenbrug | ............. G06T 15/04 345/582 |
| 2010/0110102 A1 | 5/2010 | Nystad | |
| 2013/0141445 A1* | 6/2013 | Engh-halstvedt | ..... G06T 15/503 345/506 |

(Continued)

OTHER PUBLICATIONS

Bratt, et al., U.S. Appl. No. 16/697,984, titled "Graphics Processing Systems," filed Nov. 27, 2019.

(Continued)

*Primary Examiner* — David T Welch
(74) *Attorney, Agent, or Firm* — Vierra Magen Marcus LLP

(57) ABSTRACT

A graphics processor that rasterises input primitives to generate graphics fragments to be processed and renders the graphics fragments to generate a first, higher resolution version of a render output. When processing of a render output is stopped before the render output is finished, the first resolution version of the render output is downsampled to a second, lower resolution and the downsampled data elements at the second resolution are written out together with a set of difference values indicative of the differences between the data elements at the first resolution and the downsampled data elements at the second resolution. Then, when processing of the render output is resumed, these values can be loaded in and used to reconstruct the array of data elements at the first resolution for use when continuing processing of the render output.

19 Claims, 5 Drawing Sheets

(56) References Cited

U.S. PATENT DOCUMENTS

| | | | |
|---|---|---|---|
| 2013/0293565 A1* | 11/2013 | Arvo | H04N 1/64 345/589 |
| 2014/0267258 A1 | 9/2014 | Yang et al. | |
| 2014/0267283 A1* | 9/2014 | Nystad | G06T 9/00 345/428 |
| 2014/0267377 A1* | 9/2014 | Halstvedt | G06T 11/40 345/613 |
| 2014/0354654 A1 | 12/2014 | Heggelund et al. | |
| 2015/0054845 A1* | 2/2015 | Makarov | G06T 15/503 345/582 |
| 2015/0062142 A1* | 3/2015 | Goel | G06T 15/005 345/582 |
| 2015/0103087 A1* | 4/2015 | Rouet | G06T 15/005 345/582 |
| 2015/0109313 A1 | 4/2015 | Heggelund et al. | |
| 2015/0138228 A1* | 5/2015 | Lum | G06T 15/005 345/611 |
| 2016/0035129 A1* | 2/2016 | Bolz | G06T 15/80 345/420 |
| 2016/0247310 A1* | 8/2016 | Hui | G09G 5/393 |
| 2017/0272722 A1* | 9/2017 | Salvi | H04N 13/122 |
| 2018/0068640 A1* | 3/2018 | Martin | G06K 9/0061 |
| 2018/0182066 A1* | 6/2018 | Saleh | G06T 3/40 |
| 2019/0066356 A1 | 2/2019 | Gierach et al. | |
| 2019/0080504 A1* | 3/2019 | Fielding | G06T 15/04 |
| 2019/0147296 A1* | 5/2019 | Wang | G06K 9/6271 382/157 |
| 2019/0347757 A1* | 11/2019 | Selvik | G06T 1/20 |
| 2020/0184933 A1* | 6/2020 | Nijs | G06T 5/002 |

OTHER PUBLICATIONS

Wexler, Daniel, et al., "GPU-Accelerated High-Quality Hidden Surface Removal", Proceedings of the ACM SIGGRAPH/ EUROGRAPHICS Conference on Graphics Hardware 2005.

Notice of Allowance dated Feb. 9, 2021 in U.S. Appl. No. 16/748,712.

Engh-Halstvedt, et al., U.S. Appl. No. 16/748,712, titled "Hidden Surface Removal in Graphics Processing Systems," filed Jan. 21, 2020.

* cited by examiner

Real geometry | Rendered geometry

Supersample real geometry | Rendered geometry

GRAPHICS PROCESSING SYSTEMS

BACKGROUND

The technology described herein relates to the processing of computer graphics, and in particular to a method of operating a graphics processor when generating a render output.

Graphics processing is normally carried out by first dividing the graphics processing (render) output to be rendered, such as a frame to be displayed, into a number of similar basic components (so-called "primitives") to allow the graphics processing operations to be more easily carried out. These "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render output), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive. The rendering process then derives the data, such as red, green and blue (RGB) colour values and an "Alpha" (transparency) value, necessary to represent the primitive at the sample points (i.e. "shades" each sample point). This can involve, for example, applying textures, blending sample point data values, etc. (The term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically divided (by area) into regularly-sized and shaped rendering tiles (they are usually e.g., squares or rectangles). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass any and all alternative and equivalent terms and techniques wherein the render output is rendered as a plurality of smaller area regions.)

The tiles are typically each rendered separately, and the rendered tiles are then recombined to provide the complete render output (e.g. frame for display). The rendering of a primitive for a tile is generally performed, e.g., using a set of geometry data representing the primitive, as well as state data indicative of the operations to be performed when rendering the primitive.

One problem that is encountered when processing graphics for display (when displaying computer generated images) is that the displayed image is quantised into the discrete pixel locations of the display, e.g. monitor or printer, being used. This limits the resolution of the image that is displayed and can produce unwanted visual artifacts, for example, where the resolution of the output display device is not high enough to display smooth lines. These effects are commonly referred to as "aliasing".

FIG. 1 illustrates such aliasing effects. The lefthand side of FIG. 1 shows the image to be drawn, and the righthand side shows the actual image that is displayed. As can be seen, the desired smooth curve of the white object in fact has a jagged appearance on the display. This is aliasing. (In FIG. 1, each square represents a pixel of the display, and the crosses represent the points at each (x, y) pixel location for which the colour value for that pixel location is determined (sampled). For example, the pixel A in FIG. 1 is drawn as all white, because the colour sampling point for that pixel location falls within the white object. It should be noted that in FIG. 1 only sample crosses on the pixels of interest are shown, although in practice all pixels will be sampled.)

All aliasing artifacts that could be visible to the naked eye could be removed by using a sufficiently high resolution display. However, the resolution of electronic displays and printers is typically limited, and so many graphics processing systems use other techniques to try to remove or reduce the effects of aliasing. Such techniques are typically referred to as anti-aliasing techniques. One known anti-aliasing technique is referred to as supersampling or oversampling.

In such an arrangement, there are plural sampling points (positions) per pixel of the final display, and a separate colour sample is taken for each (covered) individual sampling point (e.g. by rendering each sampling point as a separate fragment). The effect of this is that a different colour sample is taken for each sampling point of a display pixel that is covered by a primitive during the rendering process.

This means that plural colour samples are taken for each pixel of the display (one for each sampling point for the pixel, since a separate colour value is rendered for each sampling point). These plural colour samples are then combined into a single colour for the pixel when the pixel is displayed. This has the effect of smoothing or averaging the colour values from the original image at the pixel location in question.

FIG. 2 illustrates the supersampling process. In the example shown in FIG. 2, four sample points are determined for each pixel in the display and separate colour samples are taken for each sample point during the rendering process. (Each such sample can accordingly effectively be viewed as a "sub-pixel", with each pixel in the display being made up of four such sub-pixels.) The four colour value samples (sub-pixels) for a given pixel are then combined (downfiltered) such that the final colour that is used for the pixel in the display is an appropriate average (blend) of the colours of the four colour samples taken for the pixel.

This has the effect of smoothing the image that is displayed, and, e.g., reduces the prominence of aliasing artifacts by surrounding them with intermediate shades of colour. This can be seen in FIG. 2, where the pixel A now has two "white" samples and two "black" samples and so is set to, e.g., 50% "white" in the displayed image. In this way, the pixels around the edges of the white object are blurred to produce a smoother edge, based on, e.g., how many samples are found to fall on each side of the edge.

Supersampling in effect processes the screen image at a much higher resolution than will actually be used for the display, and then scales and filters (down samples) the processed image to the final resolution before it is displayed. This has the effect of providing an improved image with reduced aliasing artifacts, but requires greater processing power and/or time, since the graphics processing system must in effect process as many fragments as there are samples (such that, e.g., for 4× supersampling (i.e. where four samples are taken for each display pixel), the processing requirements will be four times greater than if there was no supersampling).

Other anti-aliasing techniques have therefore been proposed that, while still providing some improvement in image quality, have less processing requirements than full supersampling. One common such technique is referred to as "multisampling".

In the case of multisampling, multiple sampling points are again tested for each display pixel to determine whether a given primitive covers the sampling points or not when the image is rasterised into fragments (at the rasterisation stage). Thus the sampling point coverage of a primitive in a multisampling system is determined in a similar fashion to a "supersampling" system (and so the positions of the outer geometric edges of the primitives are still effectively "supersampled" (oversampled) in a multisampling system).

However, in the rendering process of a multisampling system, all the sampling points for a given display pixel that are covered by the primitive in question are allocated the same single, common set of colour value data (rather than each having their own separate set of data as would be the case for supersampling).

Thus, in multisampling, plural samples are again taken for each pixel that will make up the final display, but rather than determining a separate colour value for each sample when rendering the "pixel" (as would be the case for a full supersampling system), a single colour value is determined and applied to all the samples for a display pixel that are found to belong to the same object in the final image. In other words multisampling calculates a single colour value for a given display pixel for a given object in the scene, which colour value is applied to (reused for) all samples (sub pixels) of the display pixel that are covered by that object (in contrast to supersampling where a separate colour value is determined for each sample).

Because only a single colour value is used for multiple samples for a given display pixel, multisampling is less processing intensive than supersampling and therefore can allow faster processing and performance than supersampling.

In general, any suitable level of multisampling or supersampling (e.g. 4×, 8×, 16×) can be performed and modern graphics processing systems are typically configured to be able to support various levels of multisampling and/or supersampling, as desired.

When implementing such multisampling/supersampling techniques in a tile-based graphics processing system, the renderer may thus process multiple sampling points per display pixel (e.g. four sampling points per display pixel for 4×MSAA) to determine appropriate data (e.g. colour) values for the sampling points. The output fragment data values are then written into appropriate, e.g., tile (colour, etc.) buffers from where they can then, for example, be output to a frame buffer for display when it is desired to write out the output. The depth value for an output fragment is also written appropriately to a Z-buffer within the tile buffers.

The tile (colour, etc.) buffers and Z-buffer will thus store an appropriate colour, etc., or Z-value, respectively, for each sampling point that the buffers represent (in essence for each sampling point of a tile that is being processed). The tile buffers thus store a set of multisampled fragment data that in effect represents part of the render output (the area corresponding to the tile in question) at a first, 'full' (multi-sampled) resolution, i.e. using multiple sampling points per display pixel.

When the fragment data is to be written out, e.g., to generate the render output at a desired (lower) resolution, i.e. by resolving the multisampled fragment data for a display pixel down to a single pixel value, the multisampled fragment data from the tile buffers is thus normally input to a downsampling (multisample resolve) unit that performs the desired downsampling to the desired (lower) resolution, before the data elements representing the render output at the desired (lower) resolution are then output, e.g., to an output buffer, such as a frame buffer of a display device.

However, the Applicants believe that there remains scope for improved techniques for graphics processing.

BRIEF DESCRIPTION OF THE DRAWINGS

A number of embodiments of the technology described herein will now be described by way of example only and with reference to the accompanying drawings, in which.

Like reference numerals are used for like features and components in the Figures, where appropriate.

DETAILED DESCRIPTION

Figure 1:
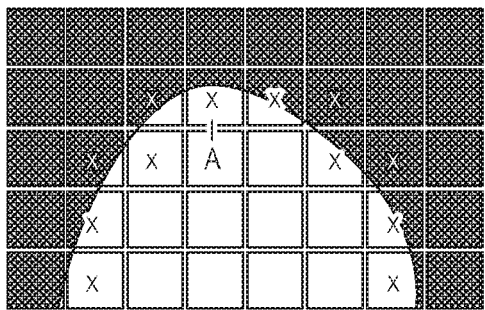
FIG. 1 shows schematically the effect of aliasing.
Figure 1:
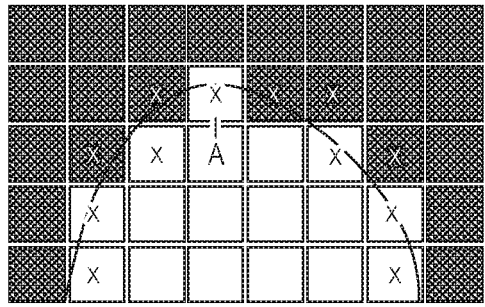
Figure 2:
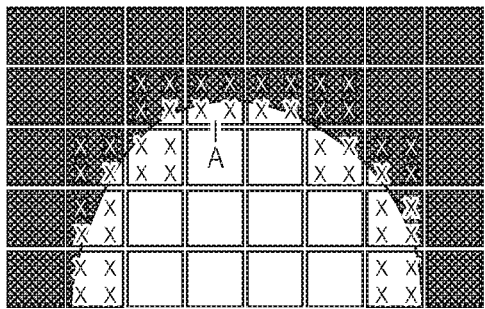
FIG. 2 shows schematically the super sampling anti-aliasing technique.
Figure 2:
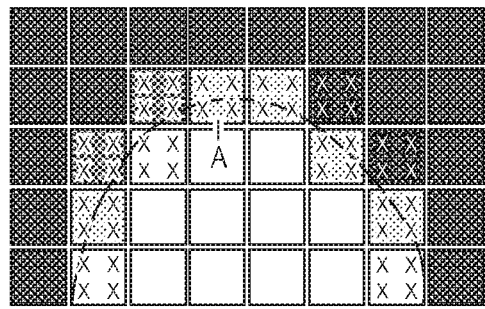

A first embodiment of the technology described herein comprises a method of operating a graphics processor when generating a render output, the graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the method comprising:
the graphics processor generating a render output by processing graphics primitives to generate an array of data elements at the first resolution that represents the render output; and storing data elements representing the render output at the first resolution;
the method further comprising:
the graphics processor stopping generating the render output, and when it does so:
downsampling the data elements stored for the render output at the first resolution to generate an array of data elements at the second resolution that represents the render output;
determining a set of difference values indicative of the differences between the data elements at the first resolution that represent the render output and the generated array of data elements at the second resolution that represents the render output; and
writing out the array of data elements at the second resolution that represents the render output, together with the determined set of difference values, to storage; and
the graphics processor resuming processing of the render output; and when it does so:
loading from storage the array of data elements at the second resolution that represents the render output, together with the determined set of difference values;
using the loaded array of data elements at the second resolution and the loaded set of difference values to reconstruct the array of data elements at the first resolution that represents the render output; and
using the reconstructed array of data elements at the first resolution that represents the render output when continuing processing of the render output.

A second embodiment of the technology described herein comprises a graphics processing system including a graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the graphics processor being configured to:
generate a render output by processing graphics primitives to generate an array of data elements at the first resolution that represents the render output; and store data elements representing the render output at the first resolution;
the graphics processor being further configured to, when it stops generating the render output before the render output has been completed:
downsample the data elements stored for the render output at the first resolution to generate an array of data elements at the second resolution that represents the render output;
determine a set of difference values indicative of the differences between the data elements at the first resolution that represent the render output and the generated array of data elements at the second resolution that represents the render output; and
write out the array of data elements at the second resolution that represents the render output, together with the determined set of difference values, to storage; and the graphics processor further configured to, when it
resumes processing of a previously stopped render
output:
load from storage the array of data elements at the
second resolution that represents the render output, together with the determined set of difference
values;
use the loaded array of data elements at the second
resolution and the loaded set of difference values
to reconstruct the array of data elements at the first
resolution that represents the render output; and
use the reconstructed array of data elements at the
first resolution that represents the render output
when continuing processing of the render output.

The technology described herein relates to the processing of graphics primitives to generate a render output. In particular, the technology described herein relates to methods of (and apparatus for) graphics processing wherein a render output is generated by first generating a higher resolution representation of the render output, but which is then "downsampled" to resolve the first, higher resolution representation of the render output to a second, lower resolution representation of the render output, e.g. at the desired output resolution (e.g. for display).

A typical example of where this may be the case would be when performing anti-aliasing techniques, such as multi-sampling anti-aliasing (MSAA), or supersampling, e.g. as described above, wherein multiple samples (sampling points) are stored and processed per output display pixel (e.g. four sampling points per display pixel for 4×MSAA), and wherein, when rendering of a fragment for the display pixel is complete, the multiple samples are "downsampled" to give a single pixel value for the render output. This downsampling is commonly referred to as a "resolve" process. For example, the simplest "resolve" process is to take an average of the data values for multiple samples associated with a display pixel (which could be a weighted average). However, other resolve processes could also be used.

Thus, in an embodiment, the first, higher resolution representation of the render output is a "multisampled" version of the render output, wherein multiple (e.g. four) sampling points are stored for each display element (pixel) in the render output, and the data elements of the first, higher resolution representation of the render output therefore represent respective data values for each of these multiple sampling points. When the render output is to be written out, this multi sampled representation of the render output is then downsampled to generate a second, lower resolution (resolved) representation of the render output, which lower resolution (resolved) version of the render output is then written out. The second, lower resolution representation of the render output is thus in an embodiment a "single sampled" version of the render output, wherein only a single sampling point is stored for each display element (pixel).

For example, in an embodiment, in the case of 4×MSAA, the first, higher resolution representation of the render output uses four data elements (corresponding to four respective sampling positions) for each data element of the second, lower resolution representation of the render output (the data elements of the second, lower resolution version corresponding to display pixels). However, the technology described herein is of course not limited to 4× multisampling, and any level of multi/supersampling (e.g. 8×, 16×, etc.), can be applied, as desired.

Other arrangements would also be possible and the technology described herein may generally be applied to any situation where the render output may be generated at a first, higher resolution, and then downsampled, in a similar fashion as described above (but not necessarily for MSAA purposes).

The technology described herein relates in particular to the situation where the generation of a render output may be stopped (e.g. because there is a need to switch to processing another render output, and/or further data needs to be generated and/or provided to allow more of the render output to be processed), but may be resumed at a later time.

The Applicants have recognised in this regard that it can be the case that processing of a given render output may need to be halted and resumed when performing graphics processing. For example, in the case where there is limited storage set aside for the data structures needed to process a render output, it may be that that storage is filled before the complete data structures for the render output have been generated. In that case, it may then be desirable to process the existing data structures for the render output (so as to, in effect, "flush" those data structures from the storage), and to then generate new data structures for the render output in question, and so on. In this case therefore, the render output being generated may, e.g., be generated as a sequence of "incremental" processing, where a first part of the data for the render output is processed, followed by a pause and/or the processing of some other render output, before the initial render output is returned to for completion (or at least continuing its processing).

This could arise, for example, in a tile-based graphics processing system, where the processing of one tile may be halted to then switch to processing the another tile and so on, with the processing alternating between different tiles, e.g. as the data structures for the different tiles are generated and consumed. Thus, in an embodiment, the render output being generated is a region (e.g. a tile) of an overall output (such as a frame to be displayed) that is being generated by the graphics processor (and thus the graphics processor is a tile-based graphics processor).

The Applicants have further recognised that where a given render output (e.g. which may be a tile into which a larger render output has been divided for rendering purposes) may only be partially processed, such that processing of that render output (e.g. tile) will need to be resumed at a later time, then data structures generated as part of the processing of the render output to date may need to be retained so that they can then be reused and continued with when processing of the render output in question is resumed.

The Applicants have further recognised that one aspect of this would be that where the render output is partially processed, and it is desired to continue processing of that render output at a later date, then it would be desirable to retain the render output values generated thus far from the partial processing of the render output for use when the processing of the render output is resumed.

The technology described herein addresses this by, when processing of a render output that is only partially completed is stopped, storing data produced from the partial processing of the render output out to storage, such that the data values can then be restored when processing of the render output is resumed.

For example, in the case of MSAA, the full resolution data values for all of the multisampled samples could be written out for the partial render, at the time at which the generation of the render output is stopped, and the full resolution samples for the partial render then restored when the rendering of the render output region in question is to be continued. However, that would involve relatively high data transfers and memory bandwidth.

To address this, and to reduce the memory bandwidth, etc., that is required, instead of writing out in 'full' the current multisample values when there is a "partial" (incremental) render (e.g. a flush, as described above), when writing out the processed data for a "partial" render, i.e. when the generation of the render output is stopped (paused), the technology described herein instead performs the required resolve operation of the samples as they currently stand and writes out the resulting resolved "downsampled" version of the render output, together with a set of difference (e.g. delta) values indicative of the differences between the data elements for the downsampled version of the render output and the array of data elements for the full multisampled version of the render output.

In other words, rather than writing out all the data elements that have been produced to date for the first, higher resolution representation of the render output (the full multisample values (at the multisample resolution)), for all of the sampling positions being processed, the technology described herein resolves the render output as it currently stands to a desired, lower sampling resolution, and the lower resolution resolved (downsampled) data array representing the render output is written out in full, together with a set of difference values indicative of the differences between the data elements at the (first) lower resolution that represent the render output and the generated array of data elements at the (second) higher resolution that represents the render output, which can then be used to reconstruct the array of data elements at the first resolution that represents the render output, e.g. when processing of the render output is resumed.

Thus, the Applicants have recognised in this regard that it can and would be possible to restore the higher resolution (multisampled) representation of the render output from the resolved, lower resolution representation of the render output, and in a suitably efficient manner, by storing and using data indicative of the differences between the two representations, such that writing out the full data elements for the higher resolution representation of the render output for later (re-)use can be omitted.

In this way, the amount of data that needs to be written out when there is a "partial" (incremental) render (flush) can be reduced. For example, in an embodiment, in the case of 4×MSAA, rather than writing out the full array of 4× sample values, for each pixel, an array of data elements representing the resolved (downsampled) pixel values for the corresponding pixels of the render output will be written out, together with a set of 4× sample values but each represented by a difference value (rather than a "full" sample value).

This then has the advantage of reducing the storage requirements and memory bandwidth, etc., required when halting processing of a render output partway through, e.g. since the full resolution data values do not need to be written out (and may thus be discarded) thereby making the overall process more efficient.

This also means that if the data elements generated for the render output by the processing so far (up to the point at which the generation of the render output was stopped) are not in fact required when generation of the render output is able to resume, there is no need to load in the data values that were written out to storage at all (and in an embodiment this is therefore not done). For instance, if (it is determined that) there are no further primitives to be processed for the render output in question when the processing is able to resume, because the resolve operation has already been performed, the rendering is complete, and no more processing needs to be done for that render output. Thus, by performing the resolve operation 'early', i.e. at the point at which the processing of the render output was stopped, the technology described herein may facilitate avoiding unnecessary loading of data back in from storage, thereby further reducing memory bandwidth.

By contrast, when implementing MSAA techniques in more conventional tile-based rendering systems, the sets of multiple sampling points are resolved only once the rendering of a tile has finished, and the resolved (downsampled) pixel values are then written back to storage (memory) at this stage. Because the rendering of the tile is completed, and the processing of the tile has finished, the full resolution multiple samples do not need to be written back to storage (memory), and so can simply be discarded.

However, the technology described herein recognises that this downsampling operation may not be so efficient when it's possible to "partially" (incrementally) render tiles (i.e. without all the geometry being available and processed).

In the technology described herein, a resolve operation is thus performed at the point at which the generation of the render output is paused (stopped). At the same time, a set of difference values are generated than can be used with the resolved version of the render output to restore the higher resolution version of the render output. This then allows the full resolution multiple sample to still not be written out, and discarded, to help reduce memory bandwidth.

On the other hand, if there are further primitives yet to be processed for the render output in question, the further processing of which may need to use the full resolution output values from the partial processing of the render output thus far (as described above), the downsampled data values, together with the difference values, can be loaded in and used to restore the full resolution version of the render output, which is then used to continue processing the render output. Thus, the higher resolution can still be restored (when required) when processing of the render output is resumed.

The graphics processor of the technology described herein generally includes a rasteriser and a renderer.

The rasteriser (rasteriser circuit) can be configured to operate in any suitable and desired manner, for example as in known rasterising arrangements. It should operate to generate graphics fragments for processing in dependence upon which sampling points (or which sets of sampling points) of an array of sampling points covering the area of the render output, a given primitive, etc., received by the rasteriser covers (at least in part).

The rasteriser in an embodiment generates a graphics fragment for each sampling point covered by, and/or for each set of plural sampling points (e.g., sampling mask) found to include a sampling point that is covered by, the (and each) primitive being rasterised (and that is not otherwise culled from processing for another reason, such as by the primitive failing the early depth test). Correspondingly, each fragment generated by the rasteriser may represent (have associated with it) a single sampling point, or plural sampling points, as desired. In an embodiment, each fragment represents a set of plural, in an embodiment a set of four (and in an embodiment a 2×2 array of), sampling points.

The renderer (renderer circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In an embodiment the renderer comprises a fragment shader (a shader pipeline) (i.e. a programmable processing circuit that is operable to and that can be programmed to carry out fragment shading programs on fragments in order to render them).

The renderer will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile (e.g. colour) buffer (as will be the case in a tile-based graphics processing system).

The render output to be generated may comprise any render output that is to be generated by the graphics processor. Thus it may comprise, for example, a tile to be generated in a tile-based graphics processor, and/or all or part of a frame of output fragment data.

As mentioned above, in an embodiment, the render output being generated is a region (e.g. a tile) of an overall output (such as a frame to be displayed) that is being generated by the graphics processor (and thus the graphics processor is a tile-based graphics processor).

The Applicants have recognised in this regard that in tile-based graphics processing systems, it may be desirable to switch from processing one tile to processing another tile or tiles, before returning to continue processing an earlier tile, and so on. This could arise, for example, where there are restrictions on the amount of storage that can be used for the tile data structures to be used when rendering tiles, such that, for example, it may be desirable to process a tile for which the relevant data structures have only been partially completed, so as to free up the memory space that is occupied by those data structures. However, that will mean that the tile has only partially been processed, and so it may then be necessary to resume processing of the tile at a later time, for example when new data structures containing new data that was not previously processed for the tile have been generated, and so on.

The stopping of the processing of a render output to thereby trigger the storing out of the data elements for the downsampled version of the render output, together with the set of difference values, e.g. as described above, can be triggered in any suitable and desired way.

For example, this may be triggered by the current data structures for the render output being processed being exhausted. For example, in the case of a tile-based graphics processing system, various data structures will be prepared for a tile to allow the tile to be generated. It may be that the data structures for a tile are not completed (do not contain all the data needed to process the tile completely) when the graphics processor is triggered to process the tile. In that case therefore, the graphics processor will process the (incomplete) data structures for the tile that it receives, but when it has finished those data structures, it will then need to wait for new data structures containing further data for the tile to be available (to be processed) before processing of the tile can be continued.

It may also be triggered, e.g., where the graphics processor needs to switch to producing a different overall render output (e.g. frame). This could arise, e.g., in the case of a context switch for Virtual Reality time warp operation, e.g. where "time warp" frames are rendered at the full frame rate (e.g. 60 fps), and the full frames for the VR application are rendered during the off-cycle of the "time warp", and are then pre-empted for time warp processing as needed. A partial frame will then be encountered when pre-emption occurs. This operation could also be triggered due to interaction with other data, such as a geometry cache, e.g. where it is desired to keep geometry in the cache at the expense of pixel traffic.

Various other arrangements would of course be possible.

In the technology described herein a first, higher resolution version of the render output is maintained and stored when generating the render output. This may be stored, e.g., in tile buffers, e.g. in the usual way. These tile buffers should be stored in appropriate (local) storage of and/or accessible to the graphics processor, such as, and in an embodiment, a (local) RAM of or associated with the graphics processor. Thus, the step of the graphics processor storing data elements representing the render output at the first resolution in an embodiment comprises storing the data elements at the first resolution in (local) storage of and/or accessible to the graphics processor.

The tile buffers could be stored in different physical memory, but are in an embodiment stored in the same physical storage.

The tile buffers store fragment colour, etc., values to be applied to the render output and can be configured in any appropriate and desired manner. The tile buffers should, and in an embodiment do, store a colour, etc. value for each sampling position of the render output (e.g. tile) that is being generated. Thus the tile buffer for a tile should, and in an embodiment do, store a current colour, etc., value for each sampling position within the tile in question. The colour, etc. values stored in the tile buffers should be, and are in an embodiment, stored and updated as primitives are rasterised/rendered to generate new fragment output data.

Thus, the data elements in the technology described herein in an embodiment comprise fragment data in the form of colour, etc., values to be used for the sampling positions in the render output. The fragment data (colour, etc.) values are in an embodiment multisampled and stored accordingly in a first, higher resolution (multisampled) format during the generation of the render output, and then resolved to give a single fragment data (colour, etc.) value for each pixel of the render output.

Depth values are in an embodiment also multisampled and may be stored in a similar fashion, e.g. in a Z-buffer within the tile buffers. The multisampled depth values are also in an embodiment processed in the same way.

When the processing of the render output in question is stopped, to thereby trigger the writing-out of the fragment data values (e.g. the colour, etc., and depth values) for the partial render output to storage, a downsampled version of the render output is written out to storage. This downsampling can be done in any appropriate and desired manner, e.g., and in an embodiment, in the normal manner for the graphics processor and graphics processing system in question. For instance, the step of the graphics processor downsampling the data elements stored for the render output at the first resolution to generate an array of data elements at the second resolution that represents the render output comprises averaging data elements at the first resolution. However, the downsampling may comprise other suitable resolve operations, as desired.

The data elements of the downsampled version of the render output may be written out in their raw format. Alternatively, the array of data elements at the second resolution that represents the render output may be written out in an encoded (compressed) format, as desired. Various suitable encoding schemes exist in this regard.

In the technology described herein, a set of difference values indicative of the differences between the data elements at the first resolution that represent the render output and the generated array of data elements at the second resolution that represents the render output is also written out, together with the downsampled version of the render output. The difference values are configured such that the set of difference values, together with the downsampled version of the render output, allow the first, higher resolution (multisampled) representation of the render output to be restored. Thus, it will be appreciated that the data elements for the first, higher resolution representation of the render output that are stored during the processing of the graphics primitives by the graphics processor need not be (and are not) written out to storage at this point, and may be discarded.

In the technology described herein, the difference values may be indicative of the differences between the data elements at the first resolution that represent the render output and the generated array of data elements at the second resolution that represents the render output in any suitable and desired way that allows the first, higher resolution representation of the render output to be restored using the difference values.

In an embodiment, the stored differences simply represent the (signed) differences (deltas) between the resolved data value and the data values for the set of (multisampled) data elements to which the resolve (downsampling) operation was applied to obtain the resolved data value (e.g. for 4×MSAA, the difference data in an embodiment represents the differences between the resolved pixel value and the values for the 4× sampling points associated with the pixel). Thus, in embodiments, the set of difference values represent the differences between the downsampled data elements representing the render output at the second resolution and the data elements stored for the render output at the first resolution.

The difference data may thus be determined appropriately based on, e.g., the level of multisampling applied and/or the resolve (downsampling) operation that is applied. For example, where the resolve operation comprises taking an average of a set of multisampled values, the difference values may then be a set of differences (deltas) to the average. However, other arrangements would of course be possible, and the encoding of the differences may be performed in a more (or less) sophisticated manner, as desired. For example, it would also be possible to encode the differences relative to one another (as well as to the resolved data value). In that case, one of the multisampled data elements (e.g. representing a first sampling position) may be taken as a reference value, and then differences (deltas) computed relative to the reference value. Another example would be compute differences relative to a median sample value.

The set of difference values may be written out in their raw format, or may be written out in an encoded (compressed) format.

The storage that the downsampled version of the render output and the higher resolution set of difference values are written to can be any suitable and desired storage of or available to the graphics processor (and of the graphics processing system). The storage is in an embodiment an appropriate memory (main memory) of or available to the graphics processor, e.g. that is part of the overall graphics processing system (data processing system) that the graphics processor is part of. Thus, in an embodiment, the downsampled version of the render output, together with the higher resolution set of difference values, are written out to appropriate DRAM (or other main memory) of the overall graphics (data) processing system. Other arrangements would, of course, be possible.

Of course the downsampled version of the render output may be written to the same, or to different, storage than the higher resolution set of difference values, so long as they can be restored together in the appropriate fashion.

As well as the resolved, lower resolution version of the render output, and the higher resolution set of difference values, any other data structures that will need to be restored when resuming processing of the render output are in an embodiment also appropriately written out to storage when processing of the render output is stopped before the render output is finished.

Once the graphics processor has stopped processing the render output in question (and the data structure(s) have been written out to storage), then the graphics processor may perform other processing, such as some or all of the processing for another render output (such as for a different tile of the frame).

Then, at a later point in time, the graphics processor will be triggered to resume processing of the render output that was only partially completed. Again, this resuming of processing of the render output may be triggered as desired, for example by there being new data structures containing new data for the render output (e.g. tile) in question that are now ready to be processed, by a context switch for VR time warp, etc.

When resuming processing of the render output region, the graphics processor is operable to load the downsampled version of the render output, together with the higher resolution set of difference values, from storage, and to use this to recreate (restore) a higher resolution version of the render output, which can then be loaded, for example, into the tile (colour) buffer, etc., for the render output, so that those buffers can be used when continuing the processing of the render output.

However, the Applicants further recognise that in some cases it may not be necessary to load the downsampled version of the render output, or the higher resolution set of difference values, from storage when processing of the render output is resumed. For example, this may be the case when the graphics processor is operable to determine whether there are any further graphics primitives that need to be processed for the render output. If there are no further graphics primitives that need to be processed for a render output, there is no need to load in the data values for that render output, and in an embodiment this is therefore not done.

Thus, in embodiments, the step of loading from storage the array of data elements at the second resolution that represents the render output, together with the determined set of difference values, may be performed conditionally on whether there are further graphics primitives to be processed for the render output.

If there are no further primitives to be processed for the render output in question, the generation of that render output is thus completed. Thus, there is no need to load (any of) the data for that render output back in, thus saving memory bandwidth in this situation. This works because, in the technology described herein, the required resolve operation has already been performed, i.e. when the generation of the render output was paused, and the render output has already been written out in the desired, resolved format.

In an embodiment, the step of loading from storage the array of data elements at the second resolution that represents the render output, together with the determined set of difference values, comprises determining whether there are further primitives to be processed for the render output, and loading the array of data elements at the second resolution that represents the render output, together with the determined set of difference values, only when it is determined that there are further graphics primitives to be processed for the render output.

It is believed that this conditional loading of such data from storage may be novel and advantageous in its own right.

Thus, a further embodiment of the technology described herein comprises a method of operating a graphics processor when generating a render output, the graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the method comprising:

the graphics processor generating a render output by processing graphics primitives to generate an array of data elements at the first resolution that represents the render output; and storing data elements representing the render output at the first resolution;

the method further comprising:

the graphics processor stopping generating the render output, and when it does so: downsampling the data elements stored for the render output at the first resolution to generate an array of data elements at the second resolution that represents the render output;

determining a set of difference values indicative of the differences between the data elements at the first resolution that represent the render output and the generated array of data elements at the second resolution that represents the render output; and writing out the array of data elements at the second resolution that represents the render output, together with the determined set of difference values, to storage; and when the graphics processor is able to resume processing of the render output, the graphics processor:

determining whether there are further primitives to be processed for the render output; and when it is determined that there are further primitives to be processed for the render output, loading the array of data elements at the second resolution that represents the render output, together with the determined set of difference values, and using these when continuing processing of the render output.

Another embodiment of the technology described herein comprises a graphics processing system including a graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the graphics processor being configured to:

generate a render output by processing graphics primitives to generate an array of data elements at the first resolution that represents the render output; and store data elements representing the render output at the first resolution;

the graphics processor being further configured to, when it stops generating the render output before the render output has been completed:

downsample the data elements stored for the render output at the first resolution to generate an array of data elements at the second resolution that represents the render output;

determine a set of difference values indicative of the differences between the data elements at the first resolution that represent the render output and the generated array of data elements at the second resolution that represents the render output; and write out the array of data elements at the second resolution that represents the render output, together with the determined set of difference values, to storage; and the graphics processor further configured to, when the graphics processor is able to resume processing of the render output:

determine whether there are further primitives to be processed for the render output; and when it is determined that there are further primitives to be processed for the render output, load the array of data elements at the second resolution that represents the render output, together with the determined set of difference values, and using these when continuing processing of the render output.

As will be appreciated by those skilled in the art, these embodiments of the technology described herein can and in an embodiment do include any one or more or all of the optional features of the technology described herein.

In these embodiments, when it is determined that there are further primitives to be processed for the render output in question, i.e. such that the data does need to be loaded in to restore the higher resolution version of the render output, the resolved version of the render output, as well as the difference-encoded multisamples to the resolved version are read back in from storage, when the generation of the render output (e.g. a tile) is to be resumed, e.g. in the manner described above.

For example, the full multisample values can then be regenerated using the resolved (downsampled) surface and the multisample difference values, and stored in the appropriate, e.g. tile, buffers to be (re-)used when continuing generation of the render output (e.g. for that tile).

Then, when the processing of the render output is to be recommenced, the higher resolution version of the render output as it stood at the point the generation of the render output was stopped is restored using the resolved render output and the difference data stored to the storage, and a new version of the higher resolution render output for use when continuing processing the render output is generated using the restored (previously stored) resolved render output and difference data.

In the case of a tile buffer, this can be, and is in an embodiment, done by loading the saved data elements from storage, using the difference data to reconstruct the data elements for the higher resolution version of the render output, and then loading the higher resolution version of the render output back into the tile (e.g. colour, etc.) and Z-buffers, for use when continuing processing of the render output. Thus, once the stored resolved data elements and difference values have been read-in, the first, higher resolution version of the render output can then be reconstructed appropriately (for example, by adding the downsampled value to each of the difference values, where the difference values are encoded in this way.

This will accordingly recreate the tile buffer(s) in its state when the processing of the render output was stopped. The technology described herein can thus be (and is) used in embodiments to restore the (multisampled) tile buffers for a tile in the event that rendering of the tile is paused.

The previously saved data elements can be used to create a tile buffer for use when continuing the processing of the render output in any suitable and desired manner. In an embodiment, the stored data elements and difference values are read-in using a DMA (direct memory access) process, but other arrangements would of course be possible. For instance, it would also be possible for a processing core (a shader core) of the graphics processor to perform the loading of the stored data elements and difference values.

As well as the current colour (tile) buffer for the render output at the time the processing of the render output was stopped, and the Z-buffer, any other data structures that are needed for continuing processing of the render output (e.g. tile) are in an embodiment correspondingly also restored from their previously saved values, as appropriate, and in the appropriate manner.

Once the colour (tile) buffers and any other data structures for the render output whose processing is being resumed have been appropriately created (restored), then processing of the render output can be, and is in an embodiment, resumed. Thus the graphics processor, once the data elements written out to storage have been loaded and used to reconstruct the higher resolution version of the render output for use when continuing the processing of the render output, the graphics processor will resume processing of primitives for the render output, including rasterising and rendering the primitives appropriately in order to continue generating the render output.

The first, higher resolution of the render output (e.g. that stored in the tile buffer) is thus updated as new primitives are received to be processed. The updated tile buffer may then be written out again, together with an updated set of difference data, as described above, in the event that the rendering of the associated tile is paused again (and/or once the rendering of the tile is completed, in which case the difference data need not be written out (although it may still be written out, but then discarded)).

Thus, in embodiments, after the downsampled data elements representing the render output at the second resolution are loaded back in from storage, together with the associated difference values, and used to reconstruct the render output at the first resolution (i.e. to repopulate the tile buffer), the generation of the render output in an embodiment continues by processing new graphics primitives to store new data elements for the render output at the first resolution and to thereby update the render output at the first resolution (to update the tile buffer). In the event that the graphics processor stops generating the render output, the updated data elements for the render output at the first resolution are then downsampled to determine updated data elements representing the render output at the second resolution, and an updated set of difference values are determined, which are then written out together with the downsampled data elements, e.g. in the same fashion described above, to allow the render output at the first resolution to be restored when the graphics processor resumes processing of the render output.

It will be appreciated from the above that in an embodiment at least, the technology described herein will involve partially processing a first render output (e.g. tile), then pausing the processing of that output while processing another render output (e.g. tile), and then resuming processing of the first render output, and so on, e.g. with repeatedly switching between processing different render outputs.

Thus, in an embodiment, the method of the technology described herein comprises (and the graphics processor is correspondingly configured to):

the graphics processor stopping processing of a first render output, and when it does so:
downsampling the data elements stored for the first render output at the first resolution to generate an array of data elements at the second resolution that represents the first render output;
determining a set of difference values indicative of the differences between the data elements at the first resolution that represent the first render output and the generated array of data elements at the second resolution that represents the first render output; and
writing out the array of data elements at the second resolution that represents the first render output, together with the determined set of difference values, to storage; and
after stopping processing of the first render output:
processing primitives to generate a second, different render output, the processing primitives to generate an array of data elements at the first resolution that represents the second render output; and
storing data elements representing the second render output at the first resolution;
the graphics processor stopping processing of the second render output, and when it does so:
downsampling the data elements stored for the second render output at the first resolution to generate an array of data elements at the second resolution that represents the second render output;
determining a set of difference values indicative of the differences between the data elements at the first resolution that represent the second render output and the generated array of data elements at the second resolution that represents the second render output; and
writing out the array of data elements at the second resolution that represents the second render output, together with the determined set of difference values, to storage.

When the generation of the second output is stopped, the graphics processor can then switch back to processing the first render output, and so on, as required.

In this case, the first and second render outputs in an embodiment comprise respective, different, tiles, of an overall render output being generated, such as of a frame to be displayed.

Correspondingly, the processing of more than two render outputs (e.g. tiles) may be interleaved in this manner. Equally, the processing of a given render output may be stopped and resumed multiple times (more than once), e.g. until the render output has been completed.

As well as the rasteriser, and renderer, etc., the graphics processor and the graphics processing pipeline that it executes can and should include other processing circuits and stages that are normally present in graphics processors and processing pipelines, such as tile (and other) buffers, depth testers, a writeback unit, a blender, etc.

The graphics processor may also comprise, and in an embodiment does also comprise, and/or is in communication with, one or more memories and/or memory devices that store the data described herein, such as the fragment data, the rendered fragment and output data, the difference data, and other state information etc., and/or that store software for performing the processes described herein. The graphics processor may also be in communication with a host microprocessor, and/or with a display for displaying images based on the data generated by the graphics processor.

The technology described herein can be used irrespective of the form of output that the graphics processor may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processor is being used to generate (e.g. in "render to texture" operation), or, indeed, where the output the graphics processor is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuits, circuitry, processing logic, microprocessor arrangements, etc., that are operable to perform the various functions, etc., such as appropriately configured dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

The technology described herein is applicable to any suitable form or configuration of graphics processing system, graphics processor, and graphics processing pipeline. The technology described herein is particularly applicable to tile-based graphics processors and graphics processing systems. Thus, in an embodiment, the graphics processor is a tile-based graphics processor.

Subject to any hardware necessary to carry out the specific functions discussed above, the graphics processor can otherwise include any one or more or all of the usual functional units, circuits, etc., that graphics processors include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The present embodiment is particularly concerned with facilitating anti-aliasing operations when, inter alia, displaying computer graphics images. Anti-aliasing is carried out by taking plural samples of an image to be displayed and then downsampling those samples to the output resolution of the display.

Figure 3:
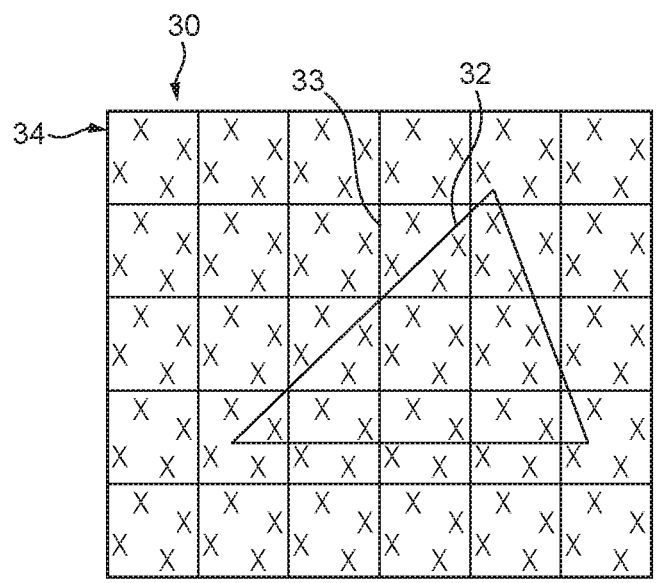
FIG. 3 shows schematically an image to be displayed.

FIG. 3, which shows schematically the basic anti-aliasing arrangement that is used in the present embodiment, shows the repeated application of a sampling mask 34 to an image to be displayed. Each application of the sampling mask 34 corresponds to a pixel of the image as it will be displayed.

Each sampling mask includes a set of sampling points that will be used to sample the image for the output pixel in question and accordingly determine how the pixel is to be displayed on the final display.

FIG. 3 also shows an image overlaid on the sampling mask array 30 in the form of a single primitive 32. (It will be appreciated here that the image has been shown in FIG. 3 as comprising a single primitive for simplicity. In practice the image (or other output) may and typically will comprise many, overlapping, primitives.) As can be seen from FIG. 3, the primitive 32 overlies some of the sampling masks in the sampling mask array 30 completely, but only passes through part of some of the other sampling masks.

To process the primitive 32 of the image, the rendering system will, in essence, determine at the rasterisation stage which of the sample points in each set of sample points of each sampling mask application are covered by the primitive 32, and then render and store data for those covered sample points so that the image of the primitive 32 can be properly displayed on the display device.

Figure 4:
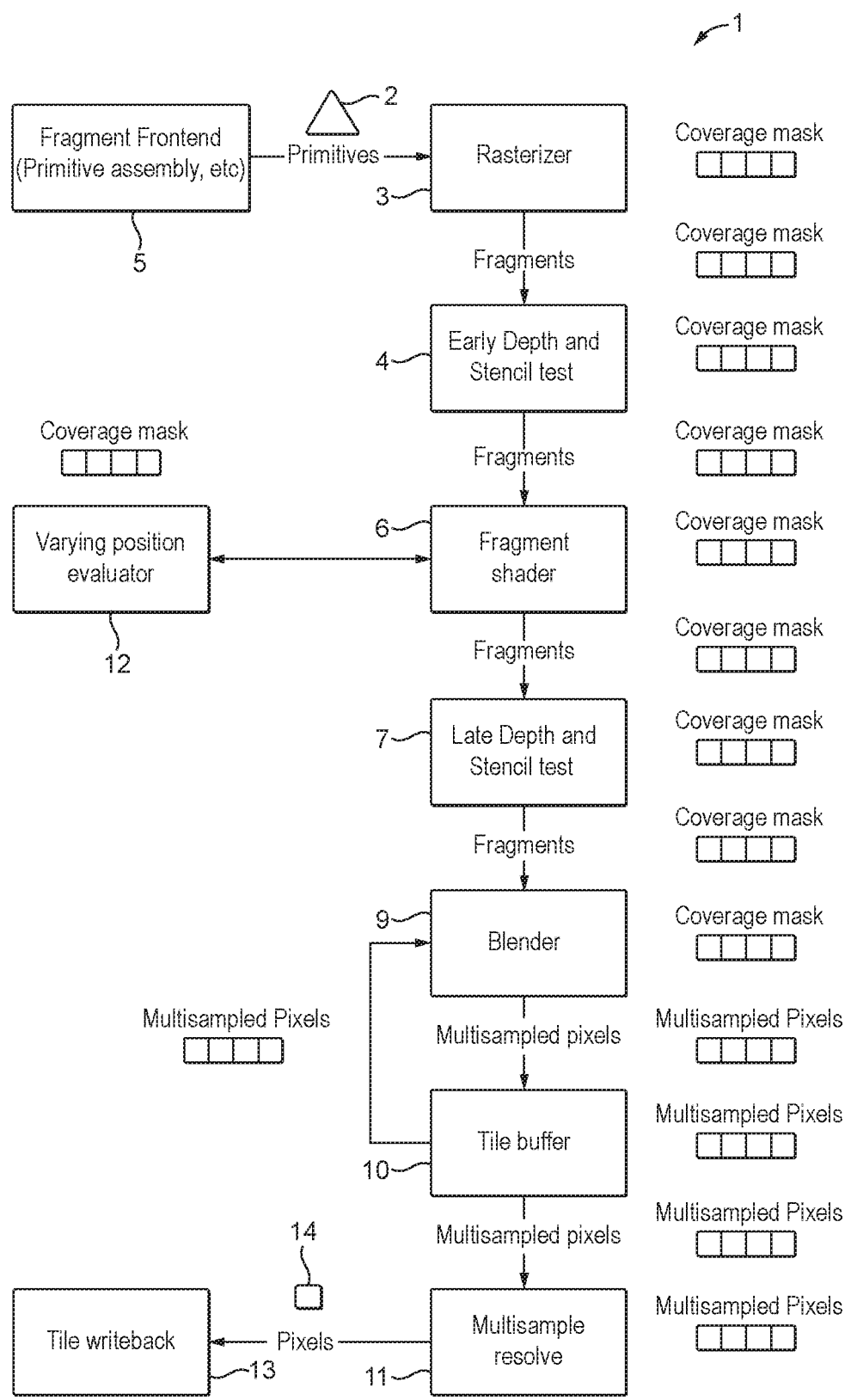
FIG. 4 shows an embodiment of a graphics processing pipeline that can be operated in accordance with the technology described herein when performing 4×MSAA.

The processing of the image of the primitive 32 for display in this manner in the present embodiment will now be described with reference to FIG. 4 which shows schematically a graphics processing pipeline 1 that may operate in accordance with the technology described herein. The graphics processing pipeline 1 shown in FIG. 4 is a tile-based renderer and will thus produce tiles of a render output data array, such as an output frame to be generated. (As will be appreciated by those skilled in the art, other rendering arrangements can be used, if desired.)

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

FIG. 4 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits/circuitry, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuits/circuitry and/or processing logic, etc., for performing the necessary operation and functions.

FIG. 4 shows schematically the pipeline stages after the graphics primitives (polygons) 2 for input to the rasterisation process have been generated. Thus, at this point the graphics data (the vertex data) has undergone fragment frontend operations 8, such as transformation and lighting operations (not shown), and a primitive set-up stage (not shown) to set-up the primitives to be rendered, in response to the commands and vertex data provided to the graphics processor.

As shown in FIG. 4, this part of the graphics processing pipeline 1 includes a number of stages, including a rasterisation stage 3, an early Z (depth) and stencil test stage 4, a fragment shading stage 6, a late Z (depth) and stencil test stage 7, a blending stage 9, tile buffers 10 and a downsampling and writeback (multisample resolve) stage 11.

In particular, FIG. 4 shows schematically the operation of the graphics processing pipeline 1 when carrying out 4×MSAA (although of course any desired level of MSAA may be applied, e.g. 8×, 16×, etc.). Thus, as shown in FIG. 4, as 4×MSAA is being carried out, the rasteriser 3 will apply (test) sampling masks having four sample positions (i.e. 4× sampling masks) to the output to be generated, and associate each fragment that it generates for rendering with a set of four sample points corresponding to a given application of the sampling mask. In other words, a single fragment is used to render all four sample points of a set of sample points of a given application of the sampling mask (and accordingly of a pixel in the output) together in one go.

Thus, in the present example, considering the image comprising the primitive 32 shown in FIG. 3, the rasteriser 3 will receive that primitive from the fragment frontend processing stages 8 of the graphics processing system, and then determine which sets of sampling points of the image (i.e. in effect which applications of the sampling mask 34 in the array 30) include sampling points that are covered by the primitive 32. (This may be carried out in any appropriate manner known in the art.) The rasteriser 3 will then generate a fragment for each application of the sampling mask found to include a sampling point that is covered by the primitive 32. Thus the rasteriser 3 will generate fragments associated with sets of four sampling points. It will then output those fragments to the later stages of the graphics processing pipeline 1 for processing.

The rasterisation stage 3 of the graphics processing pipeline 1 operates to rasterise the primitives making up the render output (e.g. the image to be displayed) into individual graphics fragments for processing. To do this, the rasteriser 3 receives graphics primitives 2 for rendering, rasterises the primitives to sampling points and generates graphics fragments having appropriate positions (representing appropriate sampling positions) for rendering the primitives.

In the present embodiment, this sample tester of the rasteriser 3 is configured to be able to test sampling masks containing four sampling points per clock cycle (i.e., in effect, to test the set of four sampling points that will be associated with a fragment that would be generated for the set of four sampling points if at least one of them is within the primitive), and thus the rasteriser 3 "natively" supports 4×MSAA.

The rasteriser generates a fragment for each application of the sampling mask found to include the primitive. These fragments are then sent onwards to the rest of the pipeline for processing.

The early Z/stencil stage 4 performs, is known in the art, a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffers 10) to determine whether the new fragments will be occluded by fragments that have already been rendered (or not). At the same time, an early stencil test is carried out.

The early depth and stencil test 4 is configured to be able to do depth and stencil testing for four samples per clock cycle, and thus "natively" supports 4×MSAA.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

The fragment shader 6 is configured to process all the sampling points associated with a fragment that it receives in parallel, i.e. to process each fragment that it receives as a whole.

The fragment shading stage 6 has associated with it a varying interpolator (a varying position evaluator) 12 which is used to determine the correct varying value for the current fragment. For certain interpolation modes, such as centroid mapping, the varying interpolator uses the fragment's associated coverage mask to select the correct position within the fragment to interpolate the varying data for. Thus, the varying interpolator 12 is configured to be able to process all the sampling points associated with a fragment that it receives in parallel, so as to be able to select the correct interpolation position for centroid mapping whether a fragment has four or eight sampling points associated with it.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The late depth and stencil testing stage 7 is also configured to be able to do depth and stencil testing for four samples per clock cycle, and thus "natively" supports 4×MSAA.

The fragments that pass the late fragment test stage 7 are then subjected to, if required, any necessary blending operations with fragments already stored in the tile buffers 10 in the blender 9. Any other remaining operations necessary on the fragments, such as dither, etc. (not shown) are also carried out at this stage.

The blender 9 is configured to be able to blend four samples per clock cycle, and thus "natively" supports 4×MSAA.

Finally, the (blended) output fragment data (values) are written to the tile buffers 10 from where they can, for example, be output to a frame buffer for display. The depth value for an output fragment is also written appropriately to a Z-buffer within the tile buffers 10. (The tile buffers and Z-buffer will store an appropriate colour, etc., or Z-value, respectively, for each sampling point that the buffers represent (in essence for each sampling point of a tile that is being processed).) The tile buffers store an array of fragment data that represents part of the render output (e.g. image to be displayed).

In the present embodiment, three tile buffers are provided. Each tile buffer stores its fragment data in a 32×32 array (i.e. corresponding to a 32×32 array of sample positions in the output to be generated, e.g., in the image to be displayed). Each 32×32 data position tile buffer can accordingly correspond to (and will "natively" support) a 16×16 pixel "tile" of, e.g., the frame to be displayed, at 4× anti-aliasing (i.e. when taking 4 samples per pixel).

These tile buffers may be provided as separate buffers, or may in fact all be part of the same, larger buffer. They are located on (local to) the graphics processing pipeline (chip).

In this embodiment, two of the three tile buffers are used to store colour (red, green, blue) values for each sampling point (it would be possible to use one tile buffer for this purpose, but two may be better), and one tile buffer is used to store Z (depth) values and stencil values for each sampling point. Other arrangements would, of course, be possible.

The data from the tile buffers 10 is input to a downsampling (multisample resolve) unit 11, and thence output (written back) to an output buffer 13 (that may not be on the graphics processing platform itself), such as a frame buffer of a display device (not shown). (The display device could comprise, e.g., a display comprising an array of pixels, such as a computer monitor or a printer.)

The downsampling unit 11 downsamples the fragment data stored in the tile buffers 10 to the appropriate resolution for the output buffer (device) (i.e. such that an array of pixel data corresponding to the pixels of the output device is generated), to generate output values (pixels) 14 for output to the output buffer 13.

The downsampling unit 11 in the graphics processing pipeline 1 in the present embodiment is configured to be able to in one downsampling operation (clock cycle) downsample four sample position values from the tile buffer 10 to a single output value, e.g. 14 for output to the output buffer 13. Thus the downsampling and writeback unit 11 is configured, in the present embodiment, to "natively" support 4× anti-aliasing.

This downsampling can take place in any suitable manner. In the present embodiment linear blending of the data is used to downsample it. However, other arrangements would be possible, if desired. If needed, the downsampling unit 11 may also apply appropriate gamma correction to the data that it outputs to the output buffer 13, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 1 would, of course, be possible. For example, while the graphics processing pipeline 1 described above is configured to "natively" support 4× multisampling, the graphics processing pipeline 1 may generally be configured to support various levels of multi/supersampling, in a similar fashion.

An embodiment of the technology described herein will now be described in more detail. The present embodiment relates in particular to the operation of a tile-based graphics processor operating a graphics processing pipeline 1, e.g. as described above, in the situation when the processing of a tile that it is rendering is interrupted, such that it then it needs to be resumed at a later date.

This may be the case where, for example, tiles are rendered incrementally, for example using multiple passes per tile, with the multiple passes for a tile being interspersed with the processing of other tiles. This could arise where, for example, there is a constraint on the amount of data that can be generated for processing a tile, such that the processing of the tile will be started after only some but not all of the data needed to completely process the tile has been generated, with the processing of the tile then having to be paused once the initially generated data structures have been consumed, while further data for processing the tile is generated, with the processing of the tile being resumed once more data for processing for the tile has been generated, and so on. This may be repeated for plural tiles making up the overall render output, e.g. frame to be displayed.

Figure 5:
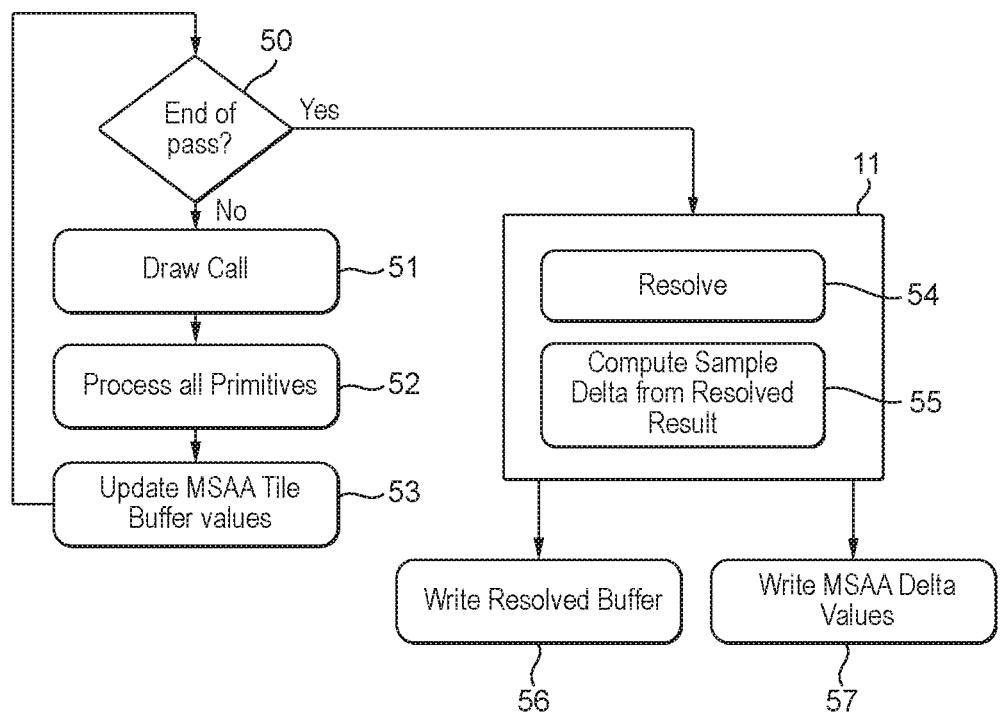
FIG. 5 shows schematically a data flow according to an embodiment of the technology described herein when generating of a render output is paused.

FIG. 5 thus shows, on the left hand side, the processing of a tile during a single such processing pass. As illustrated, during the processing pass (step 50: 'End of pass?—No'), a draw call is received to be processed (step 51), and the primitives within the draw call are then processed (step 52), e.g. in the manner described above, to generate fragment (colour, etc., and depth) data than is then written into the tile buffers 10 (step 53).

At the end of the processing pass (step 50: 'End of pass?—Yes') (which may not be, and in the present embodiment is not, the end of the processing for the tile in question, such that the rendering of the tile is merely paused, to be resumed at a later point), the data currently stored in the tile buffer 10 is then passed to the writeback (multisample resolve) stage 11, which then resolves the data in the tile buffer as it currently stands (step 54). A set of full resolution difference values representing the differences between the resolved data (from step 54) and the data currently stored in the tile buffer are then computed (step 55). The resolved buffer is then written out to memory (step 56), together with the set of difference data (step 57).

Thus, when the rendering of a tile is paused, a partial resolve is performed of the data currently stored in the tile buffers 10, and the resolved surface is then written out to memory together with a full resolution set of difference data to the resolved surface that allows the full tile buffer to then be reconstructed (e.g. rather than attempting to write out the data values from the tile buffers 10 in full, at the multi-sampled resolution).

Figure 6:
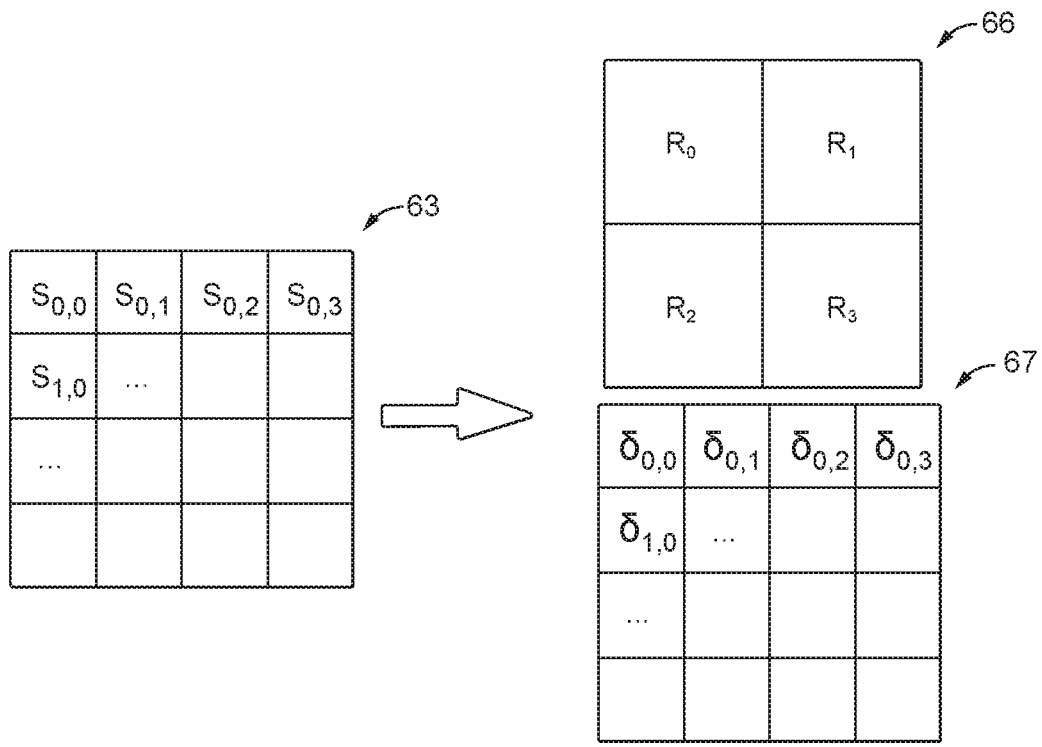
FIG. 6 shows schematically the storage of data when generation of a render output is paused according to an embodiment.

That is, as shown in FIG. 6, rather than writing out the full multisampled data values S0,0, S0,1, etc., for the data stored in the tile buffers 10 at the point at which the rendering of the tile was paused, the resolved pixel values R0, R1, etc., are written out at the lower resolution, together with a full resolution set of differences $\delta 0,0$, $\delta 0,1$, etc., that allow the full multisampled data values S0,0, S0,1, etc. to be reconstructed. For example, where the resolve operation comprises taking an average, the resolved pixel value RO is the average of the values for the four sampling points S0,0, S0,1, S1,0, S1,1 associated with the display pixel having the pixel value RO, and the difference values are computed as the deltas to that average value RO.

In that case, adding the resolved pixel values 66 to the array of difference 67 thus allows the full resolution multisampled data values 63 to be reconstructed. However, other arrangements would be possible, e.g. depending on the resolve operation and/or how the differences are encoded.

Figure 7:
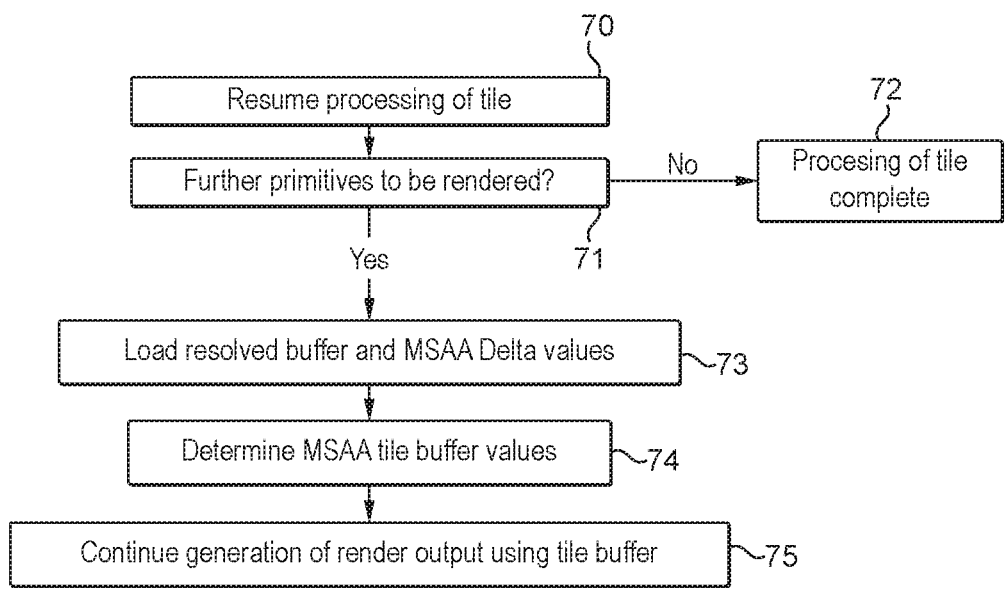
FIG. 7 shows schematically a data flow according to an embodiment of the technology described herein when generation of a previously paused render output is to be resumed.

As shown in FIG. 7, when processing of the tile in question is resumed (step 70), the stored data can thus be loaded from memory (step 73), and used to restore the multisampled tile buffers accordingly (step 74). In particular, when processing of the tile is resumed the resolved data can be read back in together with the full resolution differences and used to restore the full resolution tile buffer, which is then used when continuing generating the render output (step 75). Thus, as further primitives are received to be processed, these are rasterized and rendered appropriately to update the tile buffers, which are then ultimately passed to the downsampling unit to generate the render output (either when the generation of the render output is next paused, or when the processing of the tile is complete).

At the point when the generation of the render output was paused, the graphics processor may not know for which, if any, tiles the rendering was complete, and so, in the present embodiment, the resolved buffer and difference data is in an embodiment always written out at this point.

However, it may be the case that the rendering of an individual tile was in fact complete at that point (but this had not yet been determined).

Thus, in the present embodiment the graphics processor is operable to detect if individual tiles have any further primitives to render. If there are no further primitives, there is no need to load the full resolution samples into the tile buffer. Thus, in the present embodiment, when the graphics processor is able to resume processing of a tile, or set of tiles, a check is made as to whether there are any further graphics primitives to be rendered for the tile (or set of tiles), and if not (step 71—'No'), the processing of the tile is complete (step 72) and there is no need to load in any data from storage. On the other hand, if there are additional primitives to process (step 71—'Yes'), the processing is then resumed, e.g. as described above.

Indeed, it is a benefit of the present embodiment that because the resolve operation is performed when the generation of the render output is paused, it is not necessary to load the data back in from storage when this data is not in fact required, thus saving bandwidth.

In this way, the generation of the render output can be paused/resumed, as required, whilst reducing the memory bandwidth requirements. For instance, when the rendering of a tile is paused, the full resolution data values are not written out to memory, and can be discarded at that point. If there are further primitives to be processed for the tile in question, the resolved data can be loaded back in, together with the difference values, and used to repopulate the full resolution tile buffer, in order to continue rendering the tile. On the other hand, if there are no further primitives to be processed, the rendering is complete, since the resolve operation has already been performed.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when generating a render output, the graphics processor comprising:
 a rasteriser circuit that rasterises input primitives to generate graphics fragments to be processed, each graphics fragment having a group of one or more sampling points associated with it; and
 a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;
 the method comprising:
 the graphics processor generating a render output by processing graphics primitives to generate an array of data elements at the first resolution that represents the render output; and
 storing data elements representing the render output at the first resolution;
 the method further comprising:
 the graphics processor stopping generating the render output, and when it does so:
 downsampling the data elements stored for the render output at the first resolution to generate an array of data elements at the second resolution that represents the render output;
 determining a set of difference values indicative of the differences between the data elements at the first resolution that represent the render output and the generated array of data elements at the second resolution that represents the render output; and
 writing out the array of data elements at the second resolution that represents the render output, together with the determined set of difference values, to storage; and
 the graphics processor resuming processing of the render output; and when it does so:
 loading from storage the array of data elements at the second resolution that represents the render output, together with the determined set of difference values;
 using the loaded array of data elements at the second resolution and the loaded set of difference values to reconstruct the array of data elements at the first resolution that represents the render output; and
 using the reconstructed array of data elements at the first resolution that represents the render output when continuing processing of the render output.

2. The method of claim 1, wherein the step of loading from storage the array of data elements at the second resolution that represents the render output, together with the determined set of difference values, comprises first determining whether there are further graphics primitives to be processed for the render output, and loading the array of data elements at the second resolution that represents the render output, together with the determined set of difference values, when it is determined that there are further graphics primitives to be processed for the render output,
 whereas when it is determined that there are no further graphics primitives to be processed for the render output, the graphics processor does not load the array of data elements at the second resolution that represents the render output, or the determined set of difference values, from storage.

3. The method of claim 1, wherein the set of difference values represents the differences between the data elements at the second resolution that represents the render output and the stored data elements representing the render output at the first resolution.

4. The method of claim 1, wherein the first, higher resolution representation of the render output is a multi-sampled version of the render output, wherein multiple sampling positions are stored for each display pixel in the render output.

5. The method of claim 4, wherein the second, lower resolution representation of the render output is a single sampled version of the render output, wherein the data elements of the array of data elements at the second, lower resolution that represent the render output correspond to display pixels in the render output.

6. The method of claim 1, wherein:
 the graphics processor stopping processing the render output is triggered by current data structures to be processed for the render output being processed being exhausted; and
 the graphics processor resuming processing the render output is triggered by there being new data structures containing new data for the render output that are ready to be processed.

7. The method of claim 1, wherein the render output to be generated comprises a tile of an overall output that is being generated by the graphics processor.

8. The method of claim 1, comprising the graphics processor stopping processing of a first render output, and when it does so:
 downsampling the data elements stored for the first render output at the first resolution to generate an array of data elements at the second resolution that represents the first render output;
 determining a set of difference values indicative of the differences between the data elements at the first resolution that represent the first render output and the generated array of data elements at the second resolution that represents the first render output; and
 writing out the array of data elements at the second resolution that represents the first render output, together with the determined set of difference values, to storage; and
 after stopping processing of the first render output:

29 processing primitives to generate a second, different render output, the processing primitives to generate an array of data elements at the first resolution that represents the second render output; and storing data elements representing the second render output at the first resolution;

the graphics processor stopping processing of the second render output, and when it does so:

downsampling the data elements stored for the second render output at the first resolution to generate an array of data elements at the second resolution that represents the second render output;

determining a set of difference values indicative of the differences between the data elements at the first resolution that represent the second render output and the generated array of data elements at the second resolution that represents the second render output; and writing out the array of data elements at the second resolution that represents the second render output, together with the determined set of difference values, to storage.

9. The method of claim 1, wherein continuing processing of the render output comprises receiving new primitives to be processed for the render output, and storing updated data elements for the render output at the first resolution, the method further comprising the graphics processing stopping generating the render output at a second time, and when the generating of the render output is stopped at the second time: the graphics processor downsampling the updated data elements stored for the render output at the first resolution to determine data elements representing the render output at the second resolution; determining an updated set of difference values representing the differences between the downsampled data elements representing the render output at the second resolution and the data elements stored for the render output at the first resolution; and writing the downsampled data elements representing the updated render output at the second resolution to storage, together with the determined set of updated difference values.

10. A non-transitory computer readable storage medium storing computer software code which when executing on a processor performs a method of operating a graphics processor, the graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the method of operating the graphics processor comprising:

the graphics processor generating a render output by processing graphics primitives to generate an array of data elements at the first resolution that represents the render output; and storing data elements representing the render output at the first resolution;

the method further comprising:

the graphics processor stopping generating the render output, and when it does so:

30 downsampling the data elements stored for the render output at the first resolution to generate an array of data elements at the second resolution that represents the render output;

determining a set of difference values indicative of the differences between the data elements at the first resolution that represent the render output and the generated array of data elements at the second resolution that represents the render output; and writing out the array of data elements at the second resolution that represents the render output, together with the determined set of difference values, to storage; and the graphics processor resuming processing of the render output; and when it does so:

loading from storage the array of data elements at the second resolution that represents the render output, together with the determined set of difference values;

using the loaded array of data elements at the second resolution and the loaded set of difference values to reconstruct the array of data elements at the first resolution that represents the render output; and using the reconstructed array of data elements at the first resolution that represents the render output when continuing processing of the render output.

11. A graphics processing system including a graphics processor comprising:

a rasteriser circuit that rasterises input primitives to generate graphics fragments to be processed, each graphics fragment having a group of one or more sampling points associated with it; and a renderer circuit that renders graphics fragments generated by the rasteriser circuit to generate rendered fragment data for the graphics fragments and being operable to generate an array of data elements at a first, higher resolution that represents a render output, and to downsample the array of data elements at the first resolution when writing out the render output to generate an array of data elements at a second, lower resolution that represents the render output;

the graphics processor being configured to:

generate a render output by processing graphics primitives to generate an array of data elements at the first resolution that represents the render output; and store data elements representing the render output at the first resolution;

the graphics processor being further configured to, when it stops generating the render output before the render output has been completed:

downsample the data elements stored for the render output at the first resolution to generate an array of data elements at the second resolution that represents the render output;

determine a set of difference values indicative of the differences between the data elements at the first resolution that represent the render output and the generated array of data elements at the second resolution that represents the render output; and write out the array of data elements at the second resolution that represents the render output, together with the determined set of difference values, to storage; and the graphics processor further configured to, when it resumes processing of a previously stopped render output:

load from storage the array of data elements at the second resolution that represents the render output, together with the determined set of difference values;

use the loaded array of data elements at the second resolution and the loaded set of difference values to reconstruct the array of data elements at the first resolution that represents the render output; and use the reconstructed array of data elements at the first resolution that represents the render output when continuing processing of the render output.

12. The system of claim 11, wherein the graphics processor is configured, when loading from storage the array of data elements at the second resolution that represents the render output, together with the determined set of difference values, to first determine whether there are further graphics primitives to be processed for the render output, and to load the array of data elements at the second resolution that represents the render output, together with the determined set of difference values, when it is determined that there are further graphics primitives to be processed for the render output, whereas when it is determined that there are no further graphics primitives to be processed for the render output, the graphics processor does not load the array of data elements at the second resolution that represents the render output, or the determined set of difference values, from storage.

13. The system of claim 11, wherein the set of difference values represents the differences between the data elements at the second resolution that represents the render output and the stored data elements representing the render output at the first resolution.

14. The system of claim 11, wherein the first, higher resolution version of the render output is a multisampled render output, wherein the data elements of the first, higher resolution version of the render output correspond to a plurality of multisampled sampling points.

15. The system of claim 11, wherein the second, lower resolution version of the render output is a resolved render output, wherein the data elements of the second, lower resolution version of the render output correspond to display pixels in the render output.

16. The system of claim 11, wherein:

the graphics processor stopping processing the render output is triggered by current data structures to be processed for the render output being processed being exhausted; and the graphics processor resuming processing the render output is triggered by there being new data structures containing new data for the render output that are ready to be processed.

17. The system of claim 11, wherein the render output to be generated comprises a tile of an overall output that is being generated by the graphics processor.

18. The system of claim 11, comprising the graphics processor stopping processing of a first render output, and when it does so:

downsampling the data elements stored for the first render output at the first resolution to generate an array of data elements at the second resolution that represents the first render output;

determining a set of difference values indicative of the differences between the data elements at the first resolution that represent the first render output and the generated array of data elements at the second resolution that represents the first render output; and writing out the array of data elements at the second resolution that represents the first render output, together with the determined set of difference values, to storage; and after stopping processing of the first render output:

processing primitives to generate a second, different render output, the processing primitives to generate an array of data elements at the first resolution that represents the second render output; and storing data elements representing the second render output at the first resolution;

the graphics processor stopping processing of the second render output, and when it does so:

downsampling the data elements stored for the second render output at the first resolution to generate an array of data elements at the second resolution that represents the second render output;

determining a set of difference values indicative of the differences between the data elements at the first resolution that represent the second render output and the generated array of data elements at the second resolution that represents the second render output; and writing out the array of data elements at the second resolution that represents the second render output, together with the determined set of difference values, to storage.

19. The system of claim 11, wherein continuing processing of the render output comprises receiving new primitives to be processed for the render output, and storing updated data elements for the render output at the first resolution, the method further comprising the graphics processing stopping generating the render output at a second time, and when the generating of the render output is stopped at the second time: the graphics processor downsampling the updated data elements stored for the render output at the first resolution to determine data elements representing the render output at the second resolution; determining an updated set of difference values representing the differences between the downsampled data elements representing the render output at the second resolution and the data elements stored for the render output at the first resolution; and writing the downsampled data elements representing the updated render output at the second resolution to storage, together with the determined set of updated difference values.

* * * * *